(12) United States Patent
Vaughn et al.

(10) Patent No.: US 7,879,771 B2
(45) Date of Patent: Feb. 1, 2011

(54) NON-FLAMMABLE, NON-AQUEOUS GROUP IVB METAL ALKOXIDE CROSSLINKERS AND FRACTURING FLUID COMPOSITIONS INCORPORATING SAME

(75) Inventors: Derek E. Vaughn, Katy, TX (US); Robert H. Duncan, Cleveland (GB); David N. Harry, Katy, TX (US); Dennis A. Williams, Katy, TX (US)

(73) Assignee: Benchmark Performance Group, Inc., Houston, TX (US)

( * ) Notice: Subject to any disclaimer, the term of this patent is extended or adjusted under 35 U.S.C. 154(b) by 131 days.

(21) Appl. No.: 12/154,041

(22) Filed: May 20, 2008

(65) Prior Publication Data
US 2009/0288828 A1 Nov. 26, 2009

(51) Int. Cl.
*C09K 8/68* (2006.01)
*C09K 8/60* (2006.01)

(52) U.S. Cl. .................. 507/271; 507/203; 507/209; 507/211; 507/239; 507/261; 507/266

(58) Field of Classification Search ................ 507/271, 507/203, 209, 211, 239, 261, 266
See application file for complete search history.

(56) References Cited

U.S. PATENT DOCUMENTS
4,292,231 A * 9/1981 Gabriel et al. ............. 524/379

FOREIGN PATENT DOCUMENTS
GB 2108122 A * 5/1983

* cited by examiner

*Primary Examiner*—Timothy J. Kugel
(74) *Attorney, Agent, or Firm*—Christopher L. Makay (57) ABSTRACT

A non-aqueous, non-flammable Group IVB metal alkoxide crosslinker composition includes a non-aqueous, non-flammable Group IVB metal alkoxide, wherein the metal is chemically bonded to a glycol containing 4 or more carbons, to an alkoxy group containing 6 or more carbons, or a mixture of both. A fracturing fluid employed in the hydraulic fracturing of subterranean formations is formulated through mixture of the non-aqueous, non-flammable Group IVB metal alkoxide crosslinker composition with a polymer solution.

34 Claims, 5 Drawing Sheets

Figure 1 – WXL 1

Figure 2 – Sample 1

Figure 3 – Sample 2

Figure 4 – Sample 5

Figure 5 – Sample 1

NON-FLAMMABLE, NON-AQUEOUS GROUP IVB METAL ALKOXIDE CROSSLINKERS AND FRACTURING FLUID COMPOSITIONS INCORPORATING SAME

TECHNICAL FIELD

The present invention relates to titanium, zirconium, and hafnium (here defined as Group IVB) metal alkoxide complexes useful as crosslinkers. More specifically, the present invention relates to Group IVB metal alkoxide crosslinkers for water-based hydraulic fracturing fluids incorporating water soluble polymers. More specifically, Group IVB metal alkoxide crosslinkers are provided that are non-aqueous and non-flammable.

BACKGROUND ART

Hydraulic fracturing of subterranean formations (hereinafter referred to simply as "fracturing") often incorporates the use of viscous solutions of water-soluble polymers. These water-soluble polymer solutions are used to translate hydraulic force to the subterranean formation in order to initiate a fracture in a subterranean formation, propagate the fracture, and to facilitate the transport and distribution of particulate proppants within the fracture to sustain a highly conductive pathway with which to produce oil and gas. Water-soluble polymers historically employed in hydraulically fracturing subterranean formations are guar and derivatized guars, derivatized celluloses, and polyacrylamides. Elements (hereinafter referred to as "metals") historically used to crosslink the heretofore mentioned water-soluble polymers have been water-soluble forms of aluminum, antimony, boron, chromium, titanium, and zirconium. The crosslinking metals most commonly used today are boron and zirconium as crosslinkers for guar, hydroxypropyl guar, carboxymethyl guar, and carboxymethyl hydroxypropyl guar.

Of the Group IVB metals, titanium has been used to form crosslinked hydraulic fracturing fluids since about the mid-1970's and zirconium has been used in these same applications since about the early 1980's. Hafnium has been evaluated for use as a crosslinker in fracturing applications, but has yet to find a commercial following.

Generally speaking, Group IVB metal crosslinkers manufactured for use in fracturing applications have been either alcohol-based alkoxides or aqueous-based carboxylates. While a number of such crosslinkers have been used "as-is," meaning "as-supplied" by the manufacturer of the crosslinker, both alcohol-based alkoxide and aqueous-based carboxylate Group IVB metal crosslinkers have also been blended with alkanolamines, alkylamines, beta-diketones, polyols, carboxylic acids and carboxylic acid salts for subsequent use in fracturing applications. The addition of such blended additives is used to control the rate of crosslinking, the temperature at which crosslinking begins, and/or the rheological stability of the crosslinked fracturing fluid during the well treatment. Low molecular weight alcohols (i.e., methanol, isopropanol, n-propanol, etc.) have been blended with both alcohol-based alkoxide and aqueous-based carboxylate Group IVB metal crosslinkers as diluents and to lower the freeze point of the crosslinker.

Of the zirconium alcohol-based crosslinkers, probably the earliest and most widely used product is n-propyl zirconate, an alkoxide hereinafter referred to as "NPZ." Williams (U.S. Pat. No. 4,534,870) describes crosslinker compositions for well treatment applications incorporating NPZ and n-butyl zirconate (NBZ). Williams teaches the use of NPZ and NBZ alkoxides with triethanolamine and n-propyl and n-butyl alcohol, respectively, to form crosslinker compositions. The Williams' crosslinkers are flammable by virtue of the alcohol present in the NPZ/NBZ alkoxides as manufactured, and by the additional alcohol added to render the crosslinker composition suitable for use in well-treatment applications.

Subsequent improvements to the Williams crosslinker (for instance, U.S. Pat. Nos. 4,686,052, 4,683,068, and 4,693,254) include compositions with different ratios of triethanolamine to zirconium, and to the addition of water. These changes in the crosslinker composition as used in fracturing applications relate only to improvements in crosslinked fluid performance. They do not alter the flammable nature of the crosslinker, or vary their characterization of unused or contaminated portions as a hazardous waste because of the inherent presence of the alcohols. Alcohol-based Group IVB metal alkoxide crosslinkers are inherently less stable than their aqueous-based counterparts. Improved stability in the aqueous-based Group IVB metal carboxylate crosslinkers is believed to be due, in part, to the presence of the carboxylic acid(s) which serve to chelate the metal, whereas the absence of such stabilizing ligands in the alcohol-based Group IVB metal alkoxides make them extremely susceptible to oxo-bonding and subsequent precipitation in the presence of water or hydroxides. Precipitation of the metal renders the crosslinker unusable, hence the greater ease by which a hazardous waste might be generated from an alcohol-based Group IVB metal alkoxide complex than from the aqueous-based Group IVB metal carboxylic acid chelate.

Aqueous-based zirconium crosslinkers (for instance, U.S. Pat. Nos. 5,182,408, 5,466,846, and 5,798,320) provide for non-flammable and subsequently more environmentally-friendly crosslinkers for fracturing applications. Most of the aqueous-based zirconium carboxylate crosslinkers finding commercial application were alpha-hydroxycarboxylic acid derivatives of zirconium carbonates or zirconium sulfates. Many of the crosslinkers used in fracturing oil and gas wells were blends of zirconium carboxylates with alkanolamines, alkylamines, beta-diketones and/or polyols for the very same reasons these compounds were added to the alcohol-based crosslinkers. These crosslinkers were also diluted with water, glycols, and/or alcohols to improve field use and, in the case of the glycols and alcohols, to lower the freeze point of the crosslinker for use in sub-zero operating conditions. Aqueous-based zirconium crosslinkers have been used in polymer solutions made with both fresh-water and sea-water. They have been found suitable as crosslinking agents for guar, derivatized guar, derivatized cellulosics, and polyacrylamides. They have been used in wells with bottom-hole temperatures as low as about 85° F. and as high as about 450° F. These aqueous-based zirconium crosslinkers have been used across a very-wide pH range including, among others; use in concentrated hydrochloric acid solutions, use in carbon-dioxide foams, and use in fracturing fluids to pH 12+. Aqueous-based zirconium crosslinkers comprise a significant percentage of all zirconium crosslinkers employed in fracturing applications. Nevertheless, there is a significant quantity of alcohol-based zirconium alkoxide crosslinkers still finding use where the rheological performance obtained with alcohol-based Group IVB metal alkoxide crosslinkers is preferred. As such, there is a recognized need for Group IVB metal alkoxide crosslinkers that are non-aqueous and yet non-flammable for those fracturing applications where the rheological performance obtained with alcohol-based Group IVB metal alkoxide crosslinkers is preferred. Further, there is a desire for such crosslinkers to be of such a nature that unused portions thereof (or portions otherwise rendered unusable) do not contribute to the volume of hazardous wastes.

SUMMARY OF THE INVENTION

The performance differences in fracturing fluids crosslinked by alcohol-based Group IVB metal alkoxides versus aqueous-based Group IVB metal carboxylic acid chelates is not well understood. Insomuch as there remains significant commercial use for Group IVB metal alkoxides, there is an abiding need for Group IVB metal alkoxides that are non-aqueous and yet non-flammable. For purposes of this discussion, flammable is defined herein as having a flashpoint lower than 140° F. Non-flammable is defined herein as not-flammable; that is, as having a flashpoint of 140° F. or greater.

In accordance with the present invention, substantially non-flammable, non-aqueous Group IVB metal alkoxide crosslinkers suitable for use in well fracturing applications are provided. In one embodiment of the invention, the non-aqueous Group IVB metal alkoxide has a flashpoint greater than about 140° F. In a preferred embodiment of the invention, the non-aqueous Group IVB metal alkoxide has a flashpoint greater than about 200° F. In another preferred embodiment of the invention, the non-aqueous Group IVB metal alkoxide is suitable for use in crosslinker compositions that, surprisingly in light of the differences in chemistry between Williams (U.S. Pat. No. 4,534,870) and that taught herein, provides a rheological performance at least equal to that attained by Williams' zirconium alkoxides without the attending flammability hazards associated with the Williams' crosslinkers. The inventive non-aqueous Group IVB metal alkoxide crosslinkers are suitable for crosslinking guar and derivatized guar polymer solutions where such polymer solutions may be used to induce hydraulic fractures of subterranean formations to enhance the production of oil and gas.

DETAILED DESCRIPTION OF THE PREFERRED EMBODIMENT

Group IVB metal alkoxides currently found in commercial application as crosslinkers in hydraulic fracturing fluids are prepared by reacting a Group IVB metal tetrachloride ($MCl_4$) with an alcohol (ROH) in the presence of a hydrogen chloride acceptor, such as ammonia ($NH_3$). See equation 1.

$$MCl_4 + 4_{(excess)}ROH + 4NH_3 \rightarrow M(OR)_4 + 4NH_4Cl + _{(excess)}ROH \quad (eq.\ 1)$$

To manufacture the NPZ of the Williams' '870 patent, zirconium tetrachloride is reacted with n-propanol in the presence of ammonia to yield tetra-n-propyl zirconate and 4 mols of ammonium chloride. To assure a complete reaction of the metal tetrachloride, an excess of n-propanol is present. The alcohol is carried over to the end product NPZ. The ammonium chloride is removed by precipitation with a solvent, e.g., hexane, followed by separation by filtration or centrifugation and subsequent removal of the solvent. The zirconium concentration of the final NPZ commercial product is "fixed" by diluting the reaction product with the same alcohol used in the reaction; in this case, n-propanol to give a product that remains liquid at normal temperatures.

Often, the Group IVB metal alkoxide [$M(OR)_4$] is reacted with a chelating ligand such as an alkanolamine or a beta-diketone. Since the by-product alcohol of equation 1 is left in the final product, the final product remains flammable. See equation 2.

$M(OR)_4 = M(n\text{-}C_3H_7O)_4$, where $R=n\text{-}C_3H_7$ $$M(n\text{-}C_3H_7O)_4 + _{(excess)}ROH + 2(HOCH_2CH_2)_3N \rightarrow M(n\text{-}C_3H_7O)_2((O\text{---}C_2H_4)N(CH_2CH_2OH)_2)_2 + 2n\text{-}C_3H_7OH + _{(excess)}ROH \quad (eq.\ 2)$$

Metal carboxylates can be prepared by reacting the Group IVB metal alkoxide with a functionalized carboxylic acid. Lactic acid is the most common carboxylic acid employed, but other carboxylic acids, such as glycolic acid, citric acid, and tartaric acid have also been used. The residual alcohol can be removed by distillation and ammonium, sodium, and/or potassium hydroxide solution added to form a substantially alcohol-free aqueous solution of ammonium zirconium lactate, sodium zirconium lactate, or potassium zirconium lactate, respectively. Alkanolamines, such as diethanolamine or triethanolamine can be used in lieu of the hydroxides mentioned above to form diethanolamine zirconium lactate and triethanolamine zirconium lactate, respectively. Insomuch as these metal carboxylates are substantially free of alcohol, they are non-flammable and are stable in aqueous solution. However, they are no longer metal alkoxides, but are now metal carboxylates, defined here as a chemical class distinct from their metal alkoxide precursors by virtue of their carboxylic acid ligand and their stability in water.

As stated earlier, the alcohol in the metal alkoxide reaction product can be removed by distillation and certainly so in a process that results in an aqueous-based metal carboxylate. The obvious and, in all likelihood, most economical route to a non-flammable (non-carboxylate) metal alkoxide would be to react the metal tetrachloride with higher molecular weight (non-flammable) alcohols. However, efforts at replacing the propyl-(C3) and butyl-(C4) alcohols used so successfully by Williams (U.S. Pat. No. 4,534,870) by reacting the Group IVB metal tetrachloride with a less-flammable alcohol were unsuccessful with alcohols having molecular weights greater than about 75 (i.e., those alcohols having more than about 4 carbons; >C4). Although the higher molecular weight alcohols (>C4) are characterized by having higher flashpoints (See Table 1), the higher molecular weight alcohols (>C4) are less-reactive with the metal tetrachlorides and result in a far-less efficient reaction. Efforts to produce a commercial product by mere substitution of the propyl- or butyl-alcohols by using less flammable, higher molecular weight alcohols (>C4) failed. To produce Group IVB metal alkoxide crosslinkers with flashpoints greater than about 140° F., a method different from that used to manufacture NPZ and NBZ is required. Whether the differences in manufacturing processes or in the chemistry of the non-flammable substituent alcohols would result in performance differences in the use of non-flammable alkoxides in the manner of the Williams '870 teaching could not be anticipated.

TABLE 1

Selected Alcohol Molecular Weights/Flashpoints

| Alcohol | No. of Carbons | MW | Flashpoint |
|---|---|---|---|
| Methanol | 1 | 32.04 | 54° F. |
| Ethanol | 2 | 46.07 | 55° F. |
| n-Propanol | 3 | 60.10 | 77° F. |
| Isopropanol | 3 | 60.10 | 53° F. |
| n-Butanol | 4 | 74.12 | 95° F. |
| Isobutanol | 4 | 74.12 | 100° F. |
| sec-Butanol | 4 | 74.12 | 75° F. |
| tert-Butanol | 4 | 74.12 | 52° F. |
| 1-Pentanol | 5 | 88.15 | 123° F. |
| Isopentanol | 5 | 88.15 | 109° F. |
| 1-Hexanol | 6 | 102.18 | 149° F. |
| Benzyl alcohol | 7 | 108.14 | 220° F. |
| 2-Ethyl Hexanol | 8 | 130.23 | 178° F. |

Researchers in the field have discovered that metal alkoxides where the alkyl groups contain from 1 to about 4 carbons as well as the corresponding residual alcohols can be distilled in the presence of higher molecular weight (and less flammable) alcohols or glycols (Table 2) to generate a non-flammable metal alkoxide. As crosslinkers for aqueous based hydraulic fracturing fluids, it was expected that these higher flash point Group IVB metal alkoxides would perform more like the higher molecular weight aqueous based Group IVB metal carboxylate crosslinkers than to the low molecular weight (to C4 alcohol) Group IVB metal alkoxides of the Williams (U.S. Pat. No. 4,534,870) patent. Due to the higher molecular weight (in the case of the alcohol alternative) or to the dihydric nature of the "alcohol" (in the case of the glycol alternative), it was expected that these "alternate" C5+ higher molecular weight alcohol Group IVB metal alkoxides and the glycol Group IVB metal alkoxides would, at the most, perform more like their non-flammable high molecular weight aqueous-based counterparts, or at the very least, retain some of the deficiencies inherent in the manufacture of such products by the method used in the manufacture of NPZ and NBZ, in light of the disappointing discovery that the C5+ alcohols could not be directly substituted for the propyl- and butyl-alcohols used in the manufacture of the NPZ/NBZ employed by Williams.

It is a surprising discovery of this invention that zirconium crosslinkers formulated with zirconium to alkanolamine ratios in a manner suggested by Williams are stable, and useful as crosslinkers for polymer solutions useful to the hydraulic fracturing of subterranean formations. It is a particularly surprising discovery of this invention that stable zirconium crosslinkers formulated with metal to triethanolamine ratios in the manner taught by Williams provide for a rheological performance result at least comparable to the alcohol-based flammable crosslinkers of the Williams' patent when evaluated under identical conditions. It is a further discovery of this invention that substantially non-aqueous and non-flammable titanium alkoxide crosslinkers were also found to provide for rheologically suitable fracturing fluids. Thus, the primary benefit attendant with the Group IVB metal alkoxide crosslinkers of the instant invention is that they are not only less-flammable and environmentally more acceptable to the various transportation and environmental regulatory agencies than the Williams' alcohol-based zirconium crosslinkers, but with the attendant discovery of suitable non-flammable titanium alkoxide crosslinkers, more environmentally acceptable choices are available to workers in the field of formulating fluids for hydraulic fracturing treatments.

TABLE 2

Selected Glycol Molecular Weights/Flashpoints

| Glycol | No. of Carbons | MW | Flashpoint |
|---|---|---|---|
| Ethylene Glycol | 2 | 62.07 | 240° F. |
| 1,2 Propylene Glycol | 3 | 76.10 | 210° F. |
| 1,3 Butylene Glycol | 4 | 90.12 | 250° F. |
| Diethylene Glycol | 4 | 106.12 | 255° F. |

The less-flammable and environmentally more acceptable products used to prepare the inventive crosslinkers disclosed herein are available from Johnson Matthey Catalysts, Cleveland, England and include a C6 alcohol zirconium alkoxide (Vertec™ XL985) tetrakis(2-ethylhexyl) zirconate, a C4 glycol zirconium alkoxide (Vertec™ XL980) ethanol, 2,2'-oxybis-, zirconium (4+ salt) (4:1) in 2 moles diethylene glycol, a C6 alcohol titanium alkoxide (Vertec™ XL121) tetrakis(2-ethylhexyl) titanate, and a C4 glycol titanium alkoxide (Vertec™ XL990) ethanol, 2,2'-oxybis-, titanium (4+ salt) (4:1) in 2 moles diethylene glycol.

Not all attempts to manufacture suitable Group IVB metal alkoxides with less-flammable and more environmentally acceptable glycols succeeded. Attempts to manufacture suitable Group IVB metal alkoxides from C2 and C3 glycols failed. Likewise, attempts to manufacture a suitable 1,3 butylene glycol Group IVB metal alkoxide failed. Combining the observations on the glycols with those of the alcohols necessarily having 6 or more carbons to be characterized by having flashpoints greater than about 140° F. leaves the inventors to conclude that only Group IVB metal alkoxides of the instant invention where the glycol or the alcohol has a molecular weight greater than about 100 are suitable to the purposes of this invention.

The following examples will illustrate how stable, non-aqueous, non-flammable crosslinkers are made from these products, as well as the method by which they are evaluated. The examples will show the performance of these crosslinkers to be at least comparable to the flammable alcohol based crosslinkers taught by Williams. Table 3 lists the flash points of a crosslinker sample (hereinafter WXL-1) made per the Williams (U.S. Pat. No. 4,534,870) patent as well as the inventive crosslinker samples employing the various Johnson Matthey Catalyst Vertec™ alkoxides mentioned above and the formulations for which are described in the examples.

TABLE 3

Group IVB Metal Crosslinker Flashpoints

| Crosslinker | Alkoxide Component | Flashpoint |
|---|---|---|
| WXL-1 | NPZ | 77° F. |
| Sample 1 | Vertec ™ XL 980 | >200° F. |
| Sample 2 | Vertec ™ XL 985 | >200° F. |
| Sample 3 | Vertec ™ XL 990 | >200° F. |
| Sample 4 | Vertec ™ XL 121 | >200° F. |
| Sample 5 | Vertec ™ XL 980/985 | >200° F. |

The Group IVB metal crosslinkers of the instant invention can be used in the same fashion as the crosslinkers of the Williams (U.S. Pat. No. 4,534,870) patent to enhance the viscosity and thereby the rheological performance of guar and derivatized guar polymer solutions. Derivatized guars suitable to the purposes of this application include hydroxyalkyl guars, carboxyalkyl guars, and carboxyalkyl hydroxyalkyl guars. More specifically, suitable derivatized guars include hydroxypropyl guar (HPG), carboxymethyl guar (CMG), and carboxymethyl hydroxypropyl guar (CMHPG). The use of these polymers to the purposes of formulating fluids to facilitate the hydraulic fracturing treatments of subterranean hydrocarbon formations is well-known to one of ordinary skill in the art.

EXAMPLE I

Preparation of a CMHPG Polymer Solution

A polymer solution was prepared by adding to tap water a 50% solution of tetramethylammonium chloride, TMAC, (2 gallons per 1000 gallons equivalent), anhydrous sodium thiosulfate (5 pounds/1000 gallons equivalent), and a commercially available carboxymethyl hydroxypropyl guar (CMHPG) polymer (40 pounds per 1000 gallons equivalent). The pH was adjusted to 6.5-7.0 using dilute acetic acid, and the polymer was allowed to hydrate for 30 minutes. The pH of the polymer solution was then raised to about 10.0 using a solution of potassium carbonate and potassium hydroxide. The viscosity of the CMHPG polymer solution thus prepared was 36 centipoises as measured on a Fann Model 35 at 300 rpm at room temperature.

EXAMPLE II

Preparation of WXL-1 Zirconium Alkoxide Crosslinker

An alcohol based crosslinker, hereafter referred to as WXL-1, was prepared according to the Williams patent (U.S. Pat. No. 4,534,870) by combining 19.18 grams n-propyl alcohol (NPA) with 58.88 grams triethanolamine (TEA, 99%) and mixing for several minutes. To the alcohol/TEA solution, 20.90 grams of n-propyl zirconate (NPZ) was added and the mixture stirred for approximately 30 minutes. Finally, 0.94 grams distilled water was added, resulting in a clear crosslinker solution with a zirconium (as $ZrO_2$) content of about 5.8% by weight of the total weight of the crosslinker.

EXAMPLE III

Rheological Evaluation of a CMHPG Solution Crosslinked with WXL-1

Figure 1:
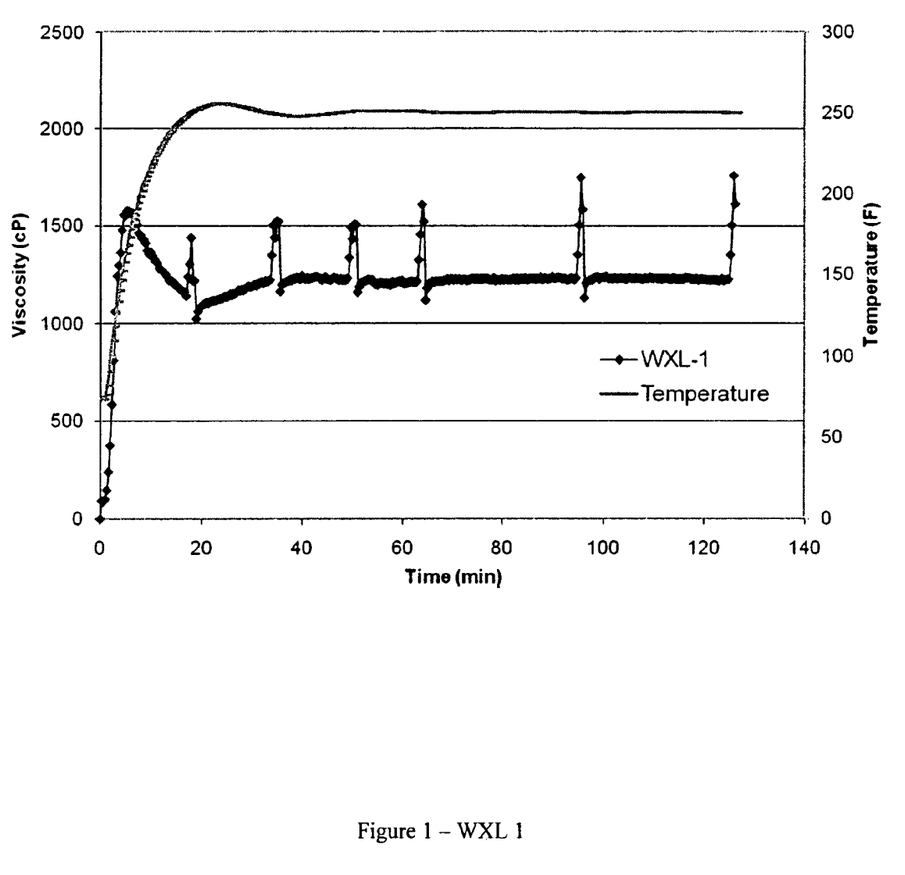
FIG. 1 is a graph illustrating the rheological performance of CMHPG crosslinked with WXL-1 (Example III).

The crosslinking performance of WXL-1 was evaluated by adding 0.75 milliliters WXL-1 (Example II) to 500 milliliters of the CMHPG polymer solution prepared in Example I and mixing for approximately 30 seconds, giving the polymer-crosslinker mixture a zirconium content (as Zr) of about 65 parts per million (ppm). Fifty (50) milliliters of this fluid was then placed in an OFITE Model 50 cup and attached to an OFITE Model 50 rheometer. The fluid was sheared at 100 reciprocal seconds ($sec^{-1}$) with a B5 bob while the temperature was increased to 250° F. Rheological and fluid viscosity profile (FVP) data are presented in Table 4 and FIG. 1, respectively. The units of K' are dynes/centimeter$^2$. Viscosities are reported in the Table as centipoises at 40, 100, and 170 reciprocal seconds (1/S), respectively at times about 0.5, 1.0, and 2.0 hours. Viscosities are reported in FIG. 1 as centipoises at 100 $sec^{-1}$ (1/S).

TABLE 4

| WXL-1 + CMHPG | | | | | |
| --- | --- | --- | --- | --- | --- |
| Time | n' | K' | cp @ 40 1/S | cp @ 100 1/S | cp @ 170 1/S |
| 0:33:09 | 0.82 | 28.33 | 1440.34 | 1217.54 | 1104.64 |
| 1:03:09 | 0.80 | 29.72 | 1441.53 | 1204.39 | 1085.34 |
| 2:04:33 | 0.77 | 34.56 | 1485.29 | 1204.24 | 1066.49 |

EXAMPLE IV

Preparation of the Inventive Non-Aqueous, Non-Flammable Group IVB Alkoxide Crosslinkers with Triethanolamine A glass beaker was charged with 35 grams triethanolamine (TEA, 99%) and 11.9 grams ethylene glycol and mixed until homogeneous. Twenty grams of zirconium alkoxide Vertec™ XL985 from Johnson Matthey Catalysts was then added slowly and mixed for 1 hour. Designated as Crosslinker Sample 1, this crosslinker has a zirconium content (as $ZrO_2$) of 6.07% by weight of the total weight of the crosslinker. Using this procedure, four more crosslinker samples, designated as Crosslinker Samples 2 through 5, respectively, were made, the formulations for which are summarized in Table 5.

TABLE 5

| Non-aqueous, non-flammable Group IVB alkoxide crosslinker formulations | | | | | |
| --- | --- | --- | --- | --- | --- |
| Component (g) | Zr Sample 1 | Zr Sample 2 | Ti Sample 3 | Ti Sample 4 | Zr Sample 5 |
| Vertec ™ XL980 | 20 | | | | 10 |
| Vertec ™ XL985 | | 20 | | | 10 |
| Vertec ™ XL990 | | | 30 | | |
| Vertec ™ XL121 | | | | 20 | |
| Triethanolamine | 40 | 35 | 30 | 24.7 | 35 |
| Ethylene Glycol | | 11.9 | | 8.2 | 10.79 |
| Percent Metal | 5.67% $ZrO_2$ | 6.07% $ZrO_2$ | 5.90% $TiO_2$ | 5.30% $TiO_2$ | 5.67% $ZrO_2$ |
| Metal:TEA | 1:9.7 | 1:7.1 | 1:4.5 | 1:4.7 | 1:7.7 |

EXAMPLE V

Rheological Evaluation of CMHPG Solution Crosslinked with Inventive Crosslinker Sample 1

Figure 2:
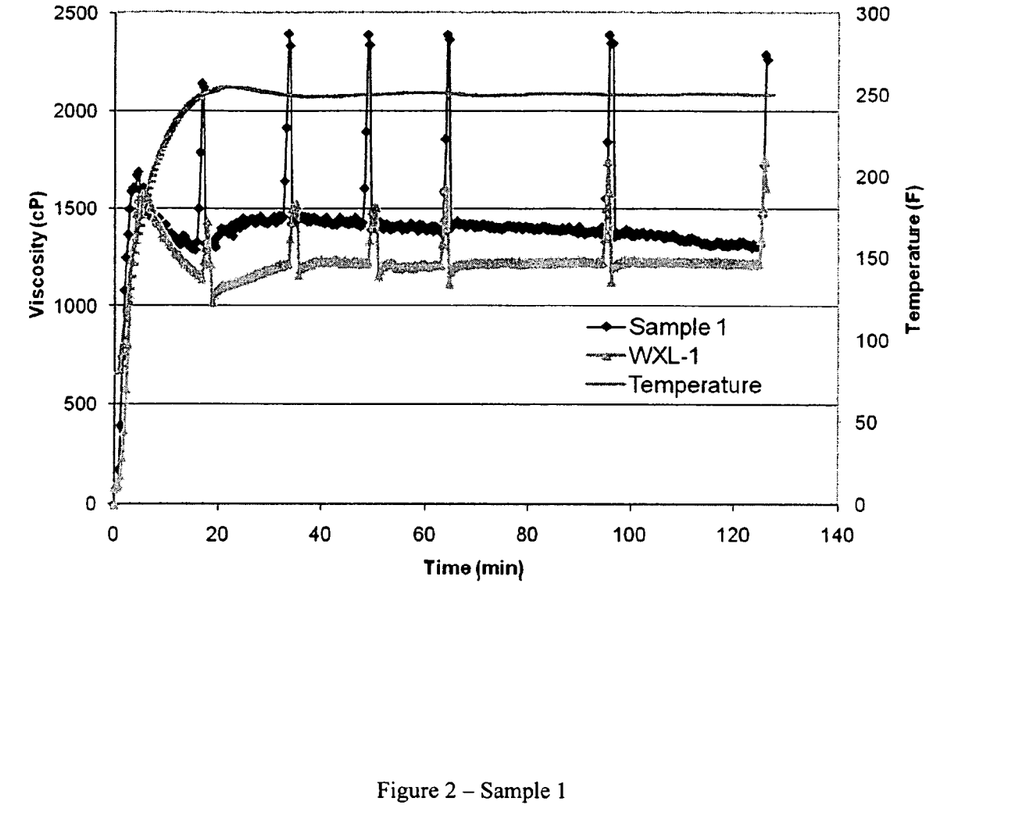
FIG. 2 is a graph comparing the rheological performance of CMHPG crosslinked with WXL-1 to CMHPG crosslinked with inventive crosslinker Sample 1 (Example V).

Crosslinker sample 1 was tested in a manner identical to that described in Example III, using an equivalent of 65 ppm zirconium. Rheological and fluid viscosity profile (FVP) data are presented in Table 6 and FIG. 2, respectively.

TABLE 6

| Inventive Zr Crosslinker Sample 1 + CMHPG | | | | | |
|---|---|---|---|---|---|
| Time | n' | K' | cp @ 40 1/S | Cp @ 100 1/S | cp @ 170 1/S |
| 0:31:17 | 0.52 | 122.08 | 2071.78 | 1333.54 | 1033.24 |
| 0:59:16 | 0.50 | 134.18 | 2084.20 | 1312.36 | 1003.97 |
| 2:03:41 | 0.45 | 134.82 | 1805.06 | 1095.42 | 820.28 |

EXAMPLE VI

Rheological Evaluation of CMHPG Solution Crosslinked with Inventive Crosslinker Sample 2

Figure 3:
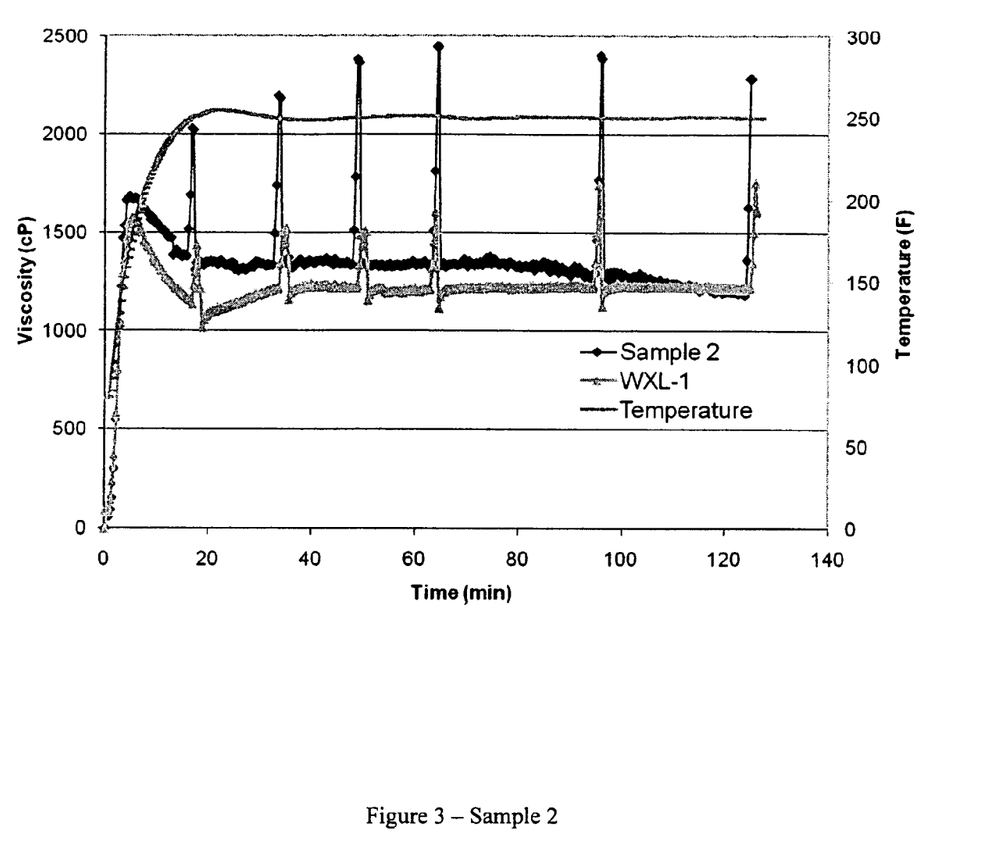
FIG. 3 is a graph comparing the rheological performance of CMHPG crosslinked with WXL-1 to CMHPG crosslinked with inventive crosslinker Sample 2 (Example VI).

Crosslinker sample 2 was tested in a manner identical to that described in Example III using 65 ppm zirconium. Rheological and fluid viscosity profile (FVP) data are presented in Table 7 and FIG. 3, respectively.

TABLE 7

| Inventive Zr Crosslinker Sample 2 + CMHPG | | | | | |
|---|---|---|---|---|---|
| Time | n' | K' | cp @ 40 1/S | Cp @ 100 1/S | cp @ 170 1/S |
| 0:31:50 | 0.64 | 67.06 | 1784.30 | 1284.23 | 1061.53 |
| 1:01:49 | 0.57 | 93.75 | 1885.25 | 1265.72 | 1004.93 |
| 2:03:13 | 0.53 | 96.98 | 1716.95 | 1116.82 | 870.61 |

EXAMPLE VII

Rheological Evaluation of CMHPG Solution Crosslinked with Inventive Crosslinker Sample 5

Figure 4:
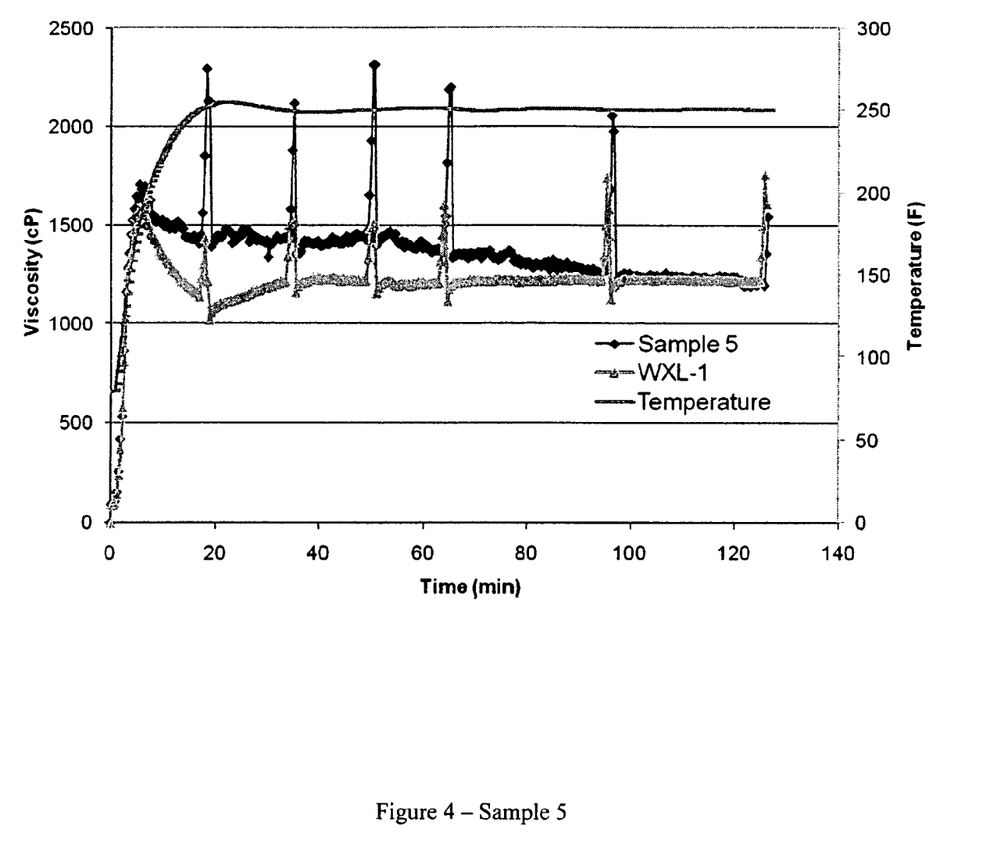
FIG. 4 is a graph comparing the rheological performance of CMHPG crosslinked with WXL-1 to CMHPG crosslinked with inventive crosslinker Sample 5 (Example VII).

Crosslinker sample 5 was tested in a manner identical to that described in Example III using 65 ppm zirconium. Rheological and fluid viscosity profile (FVP) data are presented in Table 8 and FIG. 4, respectively.

TABLE 8

| Inventive Zr Crosslinker Sample 5 + CMHPG | | | | | |
|---|---|---|---|---|---|
| Time | n' | K' | cp @ 40 1/S | Cp @ 100 1/S | cp @ 170 1/S |
| 0:33:31 | 0.70 | 56.84 | 1854.10 | 1403.72 | 1194.80 |
| 1:03:55 | 0.66 | 63.38 | 1826.77 | 1341.17 | 1121.42 |
| 2:05:19 | 0.63 | 63.77 | 1611.70 | 1145.27 | 939.69 |

EXAMPLE VIII

Rheological Evaluation of a CMHPG Solution Crosslinked with Inventive Crosslinker Sample 3

Titanium-crosslinked fluids were tested in a manner identical to that described in Example III. Crosslinker sample 3 was evaluated using an amount equivalent to 40-50 ppm titanium. The results are shown in Table 9.

TABLE 9

| Inventive Ti Crosslinker Sample 3 + CMHPG | | | | | |
|---|---|---|---|---|---|
| Time | n' | K' | cp @ 40 1/S | Cp @ 100 1/S | cp @ 170 1/S |
| 0:30:54 | 0.54 | 90.53 | 1659.75 | 1089.02 | 853.22 |
| 1:00:54 | 0.51 | 86.42 | 1394.16 | 886.15 | 681.61 |
| 2:02:18 | 0.49 | 72.58 | 1090.39 | 680.91 | 518.41 |

EXAMPLE IX

Rheological Evaluation of a CMHPG Solution Crosslinked with Sample 4

Sample 4 was evaluated in a manner identical to that described in Example III using 40-50 ppm titanium. This data is listed in Table 10.

TABLE 10

| Inventive Ti Crosslinker Sample 4 + CMHPG | | | | | |
|---|---|---|---|---|---|
| Time | n' | K' | cp @ 40 1/S | Cp @ 100 1/S | cp @ 170 1/S |
| 0:30:58 | 0.55 | 95.49 | 1820.45 | 1206.13 | 950.30 |
| 1:00:57 | 0.53 | 84.32 | 1485.02 | 964.71 | 751.47 |
| 2:02:21 | 0.52 | 66.76 | 1130.88 | 727.59 | 563.60 |

EXAMPLE X

Preparation of a CMG Polymer Solution

A polymer solution was prepared by adding to tap water a 50% solution of tetramethylammonium chloride (TMAC, 2 gallons per 1000 gallons equivalent), anhydrous sodium thiosulfate (5 pounds/1000 gallons equivalent), and a commercially available carboxymethyl guar (CMG) polymer (30 pounds per 1000 gallons equivalent). The pH was adjusted to 6.5-7.0 using dilute acetic acid, and the polymer was allowed to hydrate for 30 minutes. The pH of the polymer solution was then raised to about 10.0 using a solution of potassium carbonate and potassium hydroxide. The viscosity of the CMG polymer solution thus prepared was 25 centipoises as measured on a Fann Model 35 at 300 rpm at room temperature.

EXAMPLE XI

Rheological Evaluation of a CMG Solution Crosslinked with Inventive Crosslinker Sample 1

Figure 5:
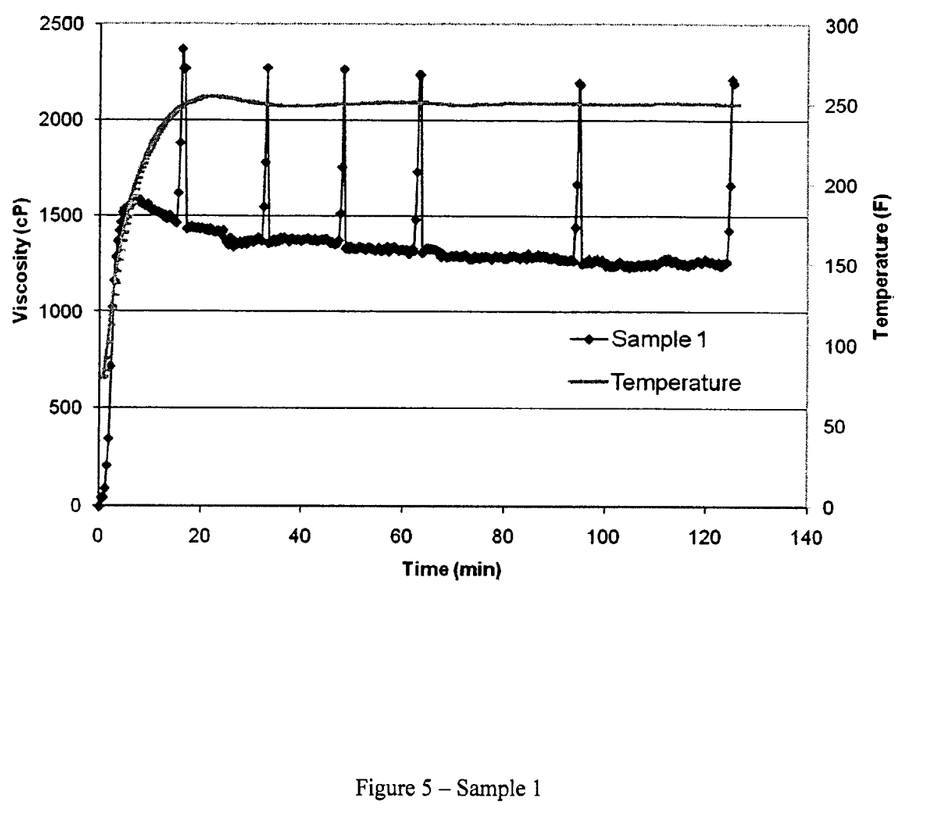
FIG. 5 is a graph illustrating the rheological performance of CMG crosslinked with inventive crosslinker Sample 1 (Example X).

Crosslinker sample 1 was tested with the carboxymethyl guar (CMG) polymer solution (prepared in Example X) in a manner identical to that described in Example III using 65 ppm zirconium. Rheological and fluid viscosity profile (FVP) data are presented in Table 11 and FIG. 5, respectively.

TABLE 11

| Inventive Zr Crosslinker Sample 1 + CMG | | | | | |
|---|---|---|---|---|---|
| Time | n' | K' | cp @ 40 1/S | Cp @ 100 1/S | cp @ 170 1/S |
| 0:32:50 | 0.63 | 70.68 | 1836.78 | 1314.27 | 1082.68 |
| 1:02:50 | 0.62 | 73.77 | 1789.11 | 1258.40 | 1026.41 |
| 2:04:14 | 0.59 | 77.44 | 1732.03 | 1194.00 | 962.61 |

EXAMPLE XII

Rheological Evaluation of a CMG Solution Crosslinked with Inventive Crosslinker Sample 4

Crosslinker sample 4 was tested with the CMG polymer solution prepared in Example X in a manner identical to that described in Example III using 50 ppm titanium. Rheological data is presented below:

TABLE 12

| Inventive Ti Crosslinker Sample 4 + CMG | | | | | |
|---|---|---|---|---|---|
| Time | n' | K' | cp @ 40 1/S | cp @ 100 1/S | cp @ 170 1/S |
| 0:29:29 | 0.51 | 86.75 | 1407.50 | 895.90 | 689.70 |
| 0:59:28 | 0.50 | 79.00 | 1256.50 | 795.90 | 610.90 |
| 2:01:32 | 0.48 | 73.59 | 1070.70 | 663.30 | 502.70 |

EXAMPLE XIII

Preparation of the Inventive Non-Aqueous, Non-Flammable Group IVB Alkoxide Crosslinkers with Various Alkanolamines A glass beaker was charged with 3.28 grams TEA and 30.0 grams XL990 and mixed until homogeneous. Designated as Crosslinker Sample 6, this crosslinker has a zirconium content (as $ZrO_2$) of 15.32% by weight of the total weight of the crosslinker, and a metal to alkanolamine molar ratio of 1:0.5. Using this procedure, four more crosslinker samples, designated as Crosslinker Samples 7 through 10, respectively, were made, the formulations for which are summarized in Table 13.

TABLE 13

| Non-aqueous, non-flammable Group IVB alkoxide crosslinker formulations with various alkanolamines | | | | | |
|---|---|---|---|---|---|
| Component | Sample 6 | Sample 7 | Sample 8 | Sample 9 | Sample 10 |
| XL980 | | 30 | | 30 | |
| XL990 | 30 | | 30 | | 30 |
| Triethanolamine, 99% | 3.28 | | | | |
| Triisopropanolamine, 85% | | 19.95 | | | |
| Monomethylethanolamine, 99% | | | 31.09 | | |
| Diethanolamine, 85% | | | | 81.64 | |
| Monoethanolamine, 99% | | | | | 50.09 |
| Percent Metal | 15.32% $ZrO_2$ | 7.09% $TiO_2$ | 8.35% $ZrO_2$ | 3.17% $TiO_2$ | 6.37% $ZrO_2$ |
| Metal:Alkanolamine | 1:0.5 | 1:2 | 1:10 | 1:15 | 1:20 |

EXAMPLE XIV

Rheological Evaluation of a Various Polymer Solutions Crosslinked with Inventive Crosslinker Samples from Example XIII Crosslinker sample 6 was tested in a manner identical to that described in Example III in a CMHPG fluid identical to that prepared in Example I, using an equivalent of 60 ppm zirconium. Rheological data are presented in Table 14.

TABLE 14

| Inventive zirconium crosslinker sample 6 + CMHPG | | | | | |
|---|---|---|---|---|---|
| Time | n' | K' | cp @ 40 1/S | cp @ 100 1/S | cp @ 170 1/S |
| 0:37:04 | 0.56 | 46.62 | 924.50 | 618.50 | 490.10 |
| 1:07:04 | 0.57 | 44.80 | 903.30 | 606.90 | 482.00 |
| 2:07:04 | 0.54 | 46.66 | 867.20 | 570.90 | 448.20 |

Crosslinker sample 7 was tested in a manner identical to that described in Example III in a CMHPG fluid identical to that prepared in Example I, using an equivalent of 60 ppm titanium. Rheological data are presented in Table 15.

TABLE 15

| Inventive titanium crosslinker sample 7 + CMHPG | | | | | |
|---|---|---|---|---|---|
| Time | n' | K' | cp @ 40 1/S | cp @ 100 1/S | cp @ 170 1/S |
| 0:37:10 | 0.59 | 78.53 | 1748.30 | 1203.80 | 969.90 |
| 1:07:10 | 0.58 | 74.60 | 1596.50 | 1088.60 | 872.10 |
| 2:07:10 | 0.58 | 64.74 | 1398.50 | 955.80 | 766.70 |

Crosslinker sample 8 was tested in a manner identical to that described in Example III in a CMHPG fluid identical to that prepared in Example I, using an equivalent of 60 ppm titanium. Rheological data are presented in Table 16.

TABLE 16

| Inventive zirconium crosslinker sample 8 + CMHPG | | | | | |
|---|---|---|---|---|---|
| Time | n' | K' | cp @ 40 1/S | cp @ 100 1/S | cp @ 170 1/S |
| 0:37:21 | 0.26 | 6.67 | 43.40 | 22.00 | 14.90 |
| 1:07:21 | 1.01 | 0.22 | 22.60 | 22.90 | 23.10 |
| 1:37:21 | 0.85 | 0.43 | 24.00 | 20.90 | 19.20 |

Crosslinker sample 9 was tested in a manner identical to that described in Example III in a CMHPG fluid identical to that prepared in Example I, using an equivalent of 60 ppm titanium. Rheological data are presented in Table 17.

TABLE 17

Inventive titanium crosslinker sample 9 + CMHPG

| Time | n' | K' | cp @ 40 1/S | cp @ 100 1/S | cp @ 170 1/S |
|---|---|---|---|---|---|
| 0:35:50 | 0.54 | 29.92 | 545.70 | 357.60 | 280.00 |
| 1:05:50 | 0.54 | 24.74 | 454.40 | 298.30 | 233.80 |
| 2:05:50 | 0.54 | 19.59 | 352.60 | 230.30 | 179.90 |

Crosslinker sample 10 was tested in a manner identical to that described in Example III in a CMHPG fluid identical to that prepared in Example I, using an equivalent of 60 ppm titanium. Rheological data are presented in Table 18.

TABLE 18

Inventive zirconium crosslinker sample 10 + CMHPG

| Time | n' | K' | cp @ 40 1/S | cp @ 100 1/S | cp @ 170 1/S |
|---|---|---|---|---|---|
| 0:37:05 | 0.45 | 40.48 | 523.40 | 314.90 | 234.60 |
| 1:07:05 | 0.44 | 29.30 | 365.30 | 217.80 | 161.50 |
| 2:07:05 | 0.49 | 15.14 | 231.30 | 145.10 | 110.70 |

The differences between alcohol-based Group IVB metal alkoxide crosslinker chemistry and aqueous-based Group IVB metal carboxylate crosslinker chemistry are not well understood. In spite of the stability and environmental improvements brought with the introduction of aqueous-based Group IVB metal carboxylate crosslinkers, there remains a preference in many hydraulic fracturing applications for the more-reactive metal alkoxide chemistry. Mere substitution of higher, non-flammable alcohols in the manufacture of Group IV-B metal alkoxide crosslinkers failed to provide useful crosslinker compositions. The development of methods distinct from those used to manufacture flammable, non-aqueous Group IVB metal alkoxides useful as crosslinkers for fracturing applications allowed for the manufacture of non-flammable, non-aqueous Group IVB metal alkoxides which were discovered to not only be useful as crosslinkers for fracturing applications, but which, surprisingly, provided for a performance indistinguishable from their alkoxide predecessors.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description; rather, it is defined only by the claims that follow.

The invention claimed is:

1. A crosslinker composition comprising a non-aqueous Group IVB metal alkoxide with alcohol distilled therefrom thereby rendering the Group IVB metal alkoxide non-flammable, wherein the metal is chemically bonded to a glycol containing 4 or more carbons, to an alkoxy group containing 6 or more carbons, or a mixture of both.

2. The crosslinker composition of claim 1 further comprising an alkanolamine.

3. The crosslinker composition of claim 2 wherein the alkanolamine is selected from the group comprising monoethanolamine, diethanolamine, triethanolamine, diisopropanolamine, triisopropanolamine, and mixtures thereof.

4. The crosslinker composition of claim 2 wherein the molar ratio of the metal to alkanolamine is from 1:0.5 to 1:20.

5. The crosslinker composition of claim 2 wherein the crosslinker has a flashpoint greater than about 140° F.

6. The crosslinker composition of claim 1 wherein the metal is titanium and the molecular weight of the titanium alkoxide is greater than about 450.

7. The crosslinker composition of claim 1 wherein the metal is zirconium and the molecular weight of the zirconium alkoxide is greater than about 500.

8. The crosslinker composition of claim 1 wherein the metal is hafnium and the molecular weight of the hafnium alkoxide is greater than about 600.

9. The crosslinker composition of claim 1 wherein the crosslinker has a flashpoint greater than about 140° F.

10. A fracturing fluid, comprising:
    a crosslinker composition comprising a non-aqueous Group IVB metal alkoxide with alcohol distilled therefrom thereby rendering the Group IVB metal alkoxide non-flammable; and
    a crosslinkable polymer solution.

11. The fracturing fluid of claim 10 wherein the polymer in the polymer solution is a polysaccharide.

12. The fracturing fluid of claim 11 wherein the polysaccharide is selected from the group comprising guar, hydroxyalkyl guar, carboxyalkyl guar, carboxyalkyl hydroxyalkyl guar, or mixtures thereof.

13. The fracturing fluid of claim 12 wherein the hydroxyalkyl guar is hydroxypropyl guar.

14. The fracturing fluid of claim 12 wherein the carboxyalkyl guar is carboxymethyl guar.

15. The fracturing fluid of claim 12 wherein the carboxyalkyl hydroxyalkyl guar is carboxymethyl hydroxypropyl guar.

16. The fracturing fluid of claim 10 wherein the Group IVB metal alkoxide crosslinker composition is represented by the form $M(OR)_4$, where R contains 4 or more carbons, and described as —C—C(—O—C—C—)$_n$OH, where n=1, 2, 3 or more.

17. The fracturing fluid of claim 16 wherein the Group IVB metal alkoxide crosslinker composition is represented by the form $M(OR)_4$, where R is an alkyl radical containing 6 or more carbons.

18. The fracturing fluid of claim 17 wherein the alkyl radical is an alkyl radical of 2-ethyl hexanol.

19. The fracturing fluid of claim 16 wherein the R group is diethylene glycol.

20. The fracturing fluid of claim 10 wherein the polymer solution comprises:
    water; and
    polymer from about 0.1% by weight to about 2% by weight of the total weight in water.

21. The fracturing fluid of claim 20 wherein the water is freshwater or saltwater or mixtures thereof.

22. The fracturing fluid of claim 10 wherein the Group IVB metal alkoxide crosslinker composition comprises an alkanolamine.

23. The fracturing fluid of claim 22 wherein the alkanolamine is selected from the group comprising monoethanolamine, diethanolamine, triethanolamine, diisopropanolamine, triisopropanolamine, and mixtures thereof.

24. The fracturing fluid of claim 10 wherein the polymer solution comprises:
    water; and
    a polymer selected from the group comprising hydroxylpropyl guar, carboxymethyl guar, and carboxymethyl hydroxypropyl guar.

25. The fracturing fluid of claim 24 wherein the Group IVB metal alkoxide crosslinker composition comprises a non-aqueous, non-flammable titanium alkoxide crosslinker.

26. The fracturing fluid of claim 24 wherein the Group IVB metal alkoxide crosslinker composition comprises a non-aqueous zirconium alkoxide, a non-aqueous hafnium alkoxide, or mixtures thereof wherein the crosslinker composition has a flashpoint greater than about 140° F.

27. The fracturing fluid of claim 24 wherein the Group IVB metal alkoxide crosslinker composition comprises a non-aqueous zirconium alkoxide, a non-aqueous hafnium alkoxide, or mixtures thereof wherein the crosslinker composition has a flashpoint greater than about 200° F.

28. The fracturing fluid of claim 10 wherein the metal in the Group IVB metal alkoxide crosslinker composition is titanium, zirconium, hafnium, or mixtures thereof.

29. The fracturing fluid of claim 10 wherein the Group IVB metal alkoxide crosslinker composition is represented by the form $M(OR)_4$, where R is a glycol radical, an alkyl radical, or mixtures thereof, where M is titanium, and where the molecular weight of the metal alkoxide is greater than about 450.

30. The fracturing fluid of claim 10 wherein the Group IVB metal alkoxide crosslinker composition is represented by the form $M(OR)_4$, where R is a glycol radical, an alkyl radical, or mixtures thereof, where M is zirconium, and where the molecular weight of the metal alkoxide is greater than about 500.

31. The fracturing fluid of claim 10 wherein the Group IVB metal alkoxide crosslinker composition is represented by the form $M(OR)_4$, where R is a glycol radical, an alkyl radical, or mixtures thereof, where M is hafnium, and where the molecular weight of the metal alkoxide is greater than about 600.

32. The fracturing fluid of claim 10 wherein the Group IVB metal alkoxide crosslinker composition has a flashpoint greater than about 140° F.

33. The fracturing fluid of claim 10 wherein the Group IVB metal alkoxide crosslinker composition has a flashpoint greater than about 200° F.

34. The fracturing fluid of claim 10 wherein the metal in the Group IVB metal alkoxide crosslinker composition is chemically bonded to a glycol containing 4 or more carbons, to an alkyl group containing 6 or more carbons, or a mixture of both.

* * * * *